US010350998B2

(12) United States Patent
Lee (10) Patent No.: US 10,350,998 B2
(45) Date of Patent: Jul. 16, 2019

(54) APPARATUS AND INTERFACE FOR VEHICLE SAFETY FUNCTION CONTROL

(71) Applicant: HYUNDAI MOTOR COMPANY, Seoul (KR)

(72) Inventor: Seung Hwan Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 374 days.

(21) Appl. No.: 15/208,365

(22) Filed: Jul. 12, 2016

(65) Prior Publication Data

US 2017/0144617 A1    May 25, 2017

(30) Foreign Application Priority Data

Nov. 23, 2015  (KR) .................. 10-2015-0164055

(51) Int. Cl.
*B60K 31/00*  (2006.01)
*B60K 35/00*  (2006.01)
*B60W 50/14*  (2012.01)
*B60W 30/182*  (2012.01)

(52) U.S. Cl.
CPC .......... *B60K 31/00* (2013.01); *B60K 31/0008* (2013.01); *B60K 35/00* (2013.01); *B60W 30/182* (2013.01); *B60W 50/14* (2013.01); *B60K 2350/1096* (2013.01); *B60K 2350/962* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 7,477,137 B2 | 1/2009 | Matsumoto et al. | |
| 8,587,649 B2 | 11/2013 | Lo et al. | |
| 2007/0236341 A1* | 10/2007 | Mackjust | B60R 25/104 340/426.13 |
| 2008/0284678 A1 | 11/2008 | Randel et al. | |
| 2013/0158820 A1* | 6/2013 | Chiu | B60K 31/0008 701/51 |
| 2016/0267335 A1* | 9/2016 | Hampiholi | G06F 3/013 |
| 2017/0352271 A1* | 12/2017 | Aoyagi | G08G 1/16 |

FOREIGN PATENT DOCUMENTS

| | | |
|---|---|---|
| CN | 101966838 A | 2/2011 |
| EP | 0392953 B1 | 8/1996 |
| JP | H09-71195 A | 3/1997 |
| JP | H10-96776 A | 4/1998 |

(Continued)

OTHER PUBLICATIONS

Korean Office Action dated Feb. 2, 2017, issued in Korean Application No. 10-2015-0164055.

*Primary Examiner* — John Olszewski
*Assistant Examiner* — Gerrad A Foster
(74) *Attorney, Agent, or Firm* — Morgan Lewis & Bockius LLP (57) ABSTRACT

An apparatus for selecting an operation of a safety driving device for a vehicle includes an input unit capable of selectively controlling operations of a plurality of safety driving support devices for the vehicle, wherein input levels inputted through the input unit are differentiated to determine whether to operate each of the plurality of the safety driving support devices for the vehicle.

19 Claims, 7 Drawing Sheets

(56) References Cited

FOREIGN PATENT DOCUMENTS

| | | |
|---|---|---|
| JP | 2008-524698 A | 7/2008 |
| KR | 10-1998-0072991 A | 11/1998 |
| KR | 2001-0069601 A | 7/2001 |
| KR | 10-2011-0059184 A | 6/2011 |
| KR | 10-1061059 B1 | 9/2011 |
| KR | 10-2014-0004357 A | 1/2014 |
| KR | 10-2014-0059083 A | 5/2014 |
| KR | 10-2014-0119433 A | 10/2014 |
| KR | 10-2015-0052251 A | 5/2015 |
| KR | 10-2015-0061752 A | 6/2015 |

* cited by examiner

| FUNCTIONS | BLIND SPOT aBSD/BSD | | | LANE DEPARTURE LKAS/LDWS | | | FORWARD COLLISION AEB/FCW | | | CITY/HIGHWAY DRIVING SUPPORT HDA/TJA | |
|---|---|---|---|---|---|---|---|---|---|---|---|
| | DI | VW | AW | DI | VW | AW | DI | VW | AW | DI | VW | AW |
| SYSTEM INTERVENTION | ● | | | | | | | | | | | |
| ACTIVE CONTROL INTERVENTION | | ● aBSD | ● | ● LKAS | ● | ● | ● AEB | ● | ● | ● | | |
| VISUAL AND AURAL WARNING | | ● BSD | ● | | ● LDWS | ● | | ● FCW | ● | | | |
| VISUAL WARNING (ALARM OFF) | | ● | | | ● | | | ● | | | | |
| SAFETY SUPPORT OFF | | | | | | | | | | | | |

FIG.6

APPARATUS AND INTERFACE FOR VEHICLE SAFETY FUNCTION CONTROL

Pursuant to 35 U.S.C. § 119(a), this application claims the benefit of priority to Korean Application No. 10-2015-0164055, filed on Nov. 23, 2015 with the Korean Intellectual Property Office, the contents of which are hereby incorporated by reference herein in their entirety.

TECHNICAL FIELD

The present disclosure relates to an apparatus and interface for a vehicle safety function control, and more particularly, to an apparatus and interface for enabling a driver to control a plurality of safety devices mounted on a vehicle and functions thereof rapidly and easily.

BACKGROUND

Recently, vehicles have been developed through collaboration with electrical, electronic and mechanical technologies, as well as communication and information technologies in order to improve safety, convenience and driving stability of the vehicle. A purpose of the safety technologies applied to the vehicles is to reduce traffic accidents and resultant losses by protecting a driver and passengers from dangerous situations such as vehicle defects, accidents, collisions, and the like through collaboration between conventional vehicle mechanics and the information technology (IT), electronic control technology, and other related technologies.

Various types of sensors for sensing surrounding conditions of the vehicle correspond to examples of the vehicle safety technology. For instance, camera/imaging, radar, laser, infrared and ultrasonic sensors mounted on a vehicle may be utilized to provide a driver (user) with information regarding the vehicle and road conditions or information regarding the relationship between the vehicle and another vehicle in the course of driving.

The driver (user) can be provided with the information through an operation of setting the safety technology installed in the vehicle before driving or an operation of resetting the safety technology installed in the vehicle while driving. However, as the number of devices in accordance with the safety technologies installed in the vehicle increases, the driver (user) may experience inconveniences in controlling the devices while driving. As a result, in many cases, drivers (users) may neglect the safety devices after setting the safety devices before driving or after the purchase of the vehicle. In other words, although the safety technology installed in the vehicle is designed to promote safety of the driver (user) by providing information suitable for varying situations the course of driving, the effects of the safety technology devices may be lowered if the driver (user) neglects the safety technology devices.

SUMMARY

Accordingly, embodiments of the present disclosure are directed to an apparatus and interface for safety function control in a vehicle that substantially obviate one or more problems due to limitations and disadvantages of the related art.

An object of the present disclosure is to provide an apparatus and method for enabling a driver (user) to control various safety devices mounted on a vehicle more easily and rapidly.

Another object of the present disclosure is to provide an apparatus and method for improving driver (user) understanding and reliability of operations of various safety devices mounted on a vehicle while driving by simply displaying operating levels of the safety devices for a driver (user) to know and/or understand the operations of the various safety devices intuitively.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, an apparatus for configuring, or selecting, an operation of a safety driving device for a vehicle according to the present disclosure may include an input unit for selectively controlling operations of a plurality of safety driving support devices for the vehicle. Input levels inputted through the input unit may be differentiated to determine whether to operate each of the plurality of the safety driving support devices for the vehicle.

The input unit may determine the input levels based on an input in a vertical direction and the input unit may call a screen for detailed configurations of the plurality of the safety driving support devices for the vehicle according to a pressure input.

The plurality of the safety driving support devices for the vehicle may selectively perform at least one selected from the group consisting of driving intervention, visual warning and aural warning.

The input levels may include a plurality of differential levels and an operating range of the each of the plurality of the safety driving support devices for the vehicle may be determined based on each of the plurality of the levels.

The input levels may include a first level in which the plurality of the safety driving support devices for the vehicle performs the driving intervention, a second level in which the plurality of the safety driving support devices for the vehicle performs both of the visual warning and the aural warning, a third level in which the plurality of the safety driving support devices for the vehicle performs the visual warning, and a fourth level in which the plurality of the safety driving support devices for the vehicle are not operated.

The plurality of the safety driving support devices for the vehicle may include at least one selected from the group consisting of intelligent cruise control (ICC), smart cruise control (SCC), lane keeping assist system (LKAS), lane departure warning system (LDWS), highway driving assist (HDA), traffic jam assist (TJA), adaptive front-lighting system (AFS), forward collision warning (FCW), intelligent night vision system (INVS), blind spot detection (BSD), pre-crash safety (PCS), autonomous emergency braking (AEB), anti-lock brake system (ABS), vehicle stability assist (VSA), collision mitigation brake system (CMBS) and emergency steering assist (ESA).

The apparatus may further include a display unit for displaying the input levels.

The display unit may include symbols, which can be discriminated from each other by at least one of different colors and different brightness levels, corresponding to the input levels.

The input unit and the display unit may be located on a dashboard.

The plurality of the safety driving support devices for the vehicle may only include a device capable of performing an operation selected by a driver.

The apparatus may further include a configuration storage unit for storing a driver's respective configuration values with respect to devices mounted on the vehicle. The plurality of the safety driving support devices for the vehicle may be operated based on the input levels transferred through the input unit and the respective configuration values.

In another aspect of the present disclosure, a method of configuring, or selecting, an operation of a safety driving device for a vehicle according to the present disclosure may include providing a plurality of levels for differentiating operating ranges of a plurality of safety driving support devices for the vehicle, selecting one from the plurality of the levels through a first movement of an input unit, and readjusting the operating ranges through a second movement of the input unit different from the first movement of the input unit.

The method may further include changing at least one of a symbol color and symbol brightness level to match the selected level.

The plurality of the safety driving support devices for the vehicle may selectively perform at least one selected from the group consisting of driving intervention, visual warning and aural warning.

The plurality of the levels may include a first level in which the plurality of the safety driving support devices for the vehicle performs the driving intervention, a second level in which the plurality of the safety driving support devices for the vehicle performs both of the visual warning and the aural warning, a third level in which the plurality of the safety driving support devices for the vehicle performs the visual warning and a fourth level in which the plurality of the safety driving support devices for the vehicle are not operated.

The plurality of the safety driving support devices for the vehicle may include at least one selected from the group consisting of intelligent cruise control (ICC), smart cruise control (SCC), lane keeping assist system (LKAS), lane departure warning system (LDWS), highway driving assist (HDA), traffic jam assist (TJA), adaptive front-lighting system (AFS), forward collision warning (FCW), intelligent night vision system (INVS), blind spot detection (BSD), pre-crash safety (PCS), autonomous emergency braking (AEB), anti-lock brake system (ABS), vehicle stability assist (VSA), collision mitigation brake system (CMBS) and emergency steering assist (ESA).

The plurality of the safety driving support devices for the vehicle may only include a device capable of performing an operation selected by a driver.

In a further aspect of the present disclosure, an input apparatus for controlling an operation, or a selection, of a safety driving device for a vehicle according to the present disclosure may include a wheel for detecting a first input on the basis of a degree of scrolling in either a vertical or a horizontal direction and a protrusion for detecting a second input on the basis of a pressure. Based on the first input and the second input, the input apparatus may control operations differentiated to determine whether to operate each of a plurality of safety driving support devices for the vehicle.

The first input may determine operating ranges of the plurality of the safety driving support devices for the vehicle and the second input may call a screen for configuring operations of the plurality of the safety driving support devices for the vehicle.

The operating ranges may include a first level in which the plurality of the safety driving support devices for the vehicle performs driving intervention, a second level in which the plurality of the safety driving support devices for the vehicle performs visual warning and aural warning, a third level in which the plurality of the safety driving support devices for the vehicle performs the visual warning, and a fourth level in which the plurality of the safety driving support devices for the vehicle are not operated.

The input apparatus may be interconnected with a display unit for displaying the operating ranges.

The display unit may include symbols, which can be discriminated from each other by at least one of different colors and different brightness levels, corresponding to the operating ranges.

In a further aspect of the present disclosure, an apparatus for configuring an operation of a safety driving device for a vehicle comprises a processing system that comprises at least one data processor and at least one computer-readable memory storing a computer program. Herein, the processing system may provide a plurality of levels for differentiating operating ranges of a plurality of safety driving support devices for the vehicle, select one from the plurality of the levels through a first movement of an input unit, and readjust the operating ranges through a second movement of the input unit different from the first movement of the input unit.

In a further aspect of the present disclosure, a computer-readable recording medium may record the above-described method for configuring an operation of a safety driving device for a vehicle therein.

The aforementioned embodiments of the present disclosure are only a part of the embodiments of the present disclosure and various embodiments in which technical features of the present disclosure are reflected may be devised and understood based on the detailed description of the present disclosure, which will be described later, by the person with ordinary skill in the art.

Accordingly, the present disclosure provides the following effects and/or advantages.

First, a driver (user) can easily control a plurality of safety devices mounted on a vehicle while driving and thus driving stability can be improved.

Second, an interior of a vehicle can be simply designed and a driver (user) understanding can also be improved through integration of interfaces for setting and controlling a plurality of safety devices mounted on the vehicle.

Effects obtainable from the present disclosure may be non-limited by the above mentioned effect. And, other unmentioned effects can be clearly understood from the following description by those having ordinary skill in the technical field to which the present disclosure pertains.

BRIEF DESCRIPTION OF THE DRAWINGS

The accompanying drawings, which are included to provide further understanding of the disclosure, illustrate embodiments of the disclosure and together with the description serve to explain the principle of the disclosure. However, technical features of the present disclosure are not limited to a specific drawing. And, it should be understood that technical features disclosed in the drawings can be combined to implement a new embodiment. In the drawings.

DETAILED DESCRIPTION

Reference will now be made in detail to embodiments of the present disclosure, examples of which are illustrated in the accompanying drawings. In the following description, suffixes "module" and "unit" may be given to components of the electronic device in consideration of only facilitation of description and do not have meanings or functions discriminated from each other.

In the descriptions of the embodiments, it will be understood that when an element is referred to as being above (over) or below (under) another element, the two elements may be in direct contact with each other, or one or more other elements may be disposed between the two elements. In addition, the term above (over) or below (under) used herein may represent a downward direction in addition to an upward direction with respect to one element.

The terms "a" or "an", as used herein, are defined as one, or more than one. The term "another", as used herein, is defined as at least a second one or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 1:
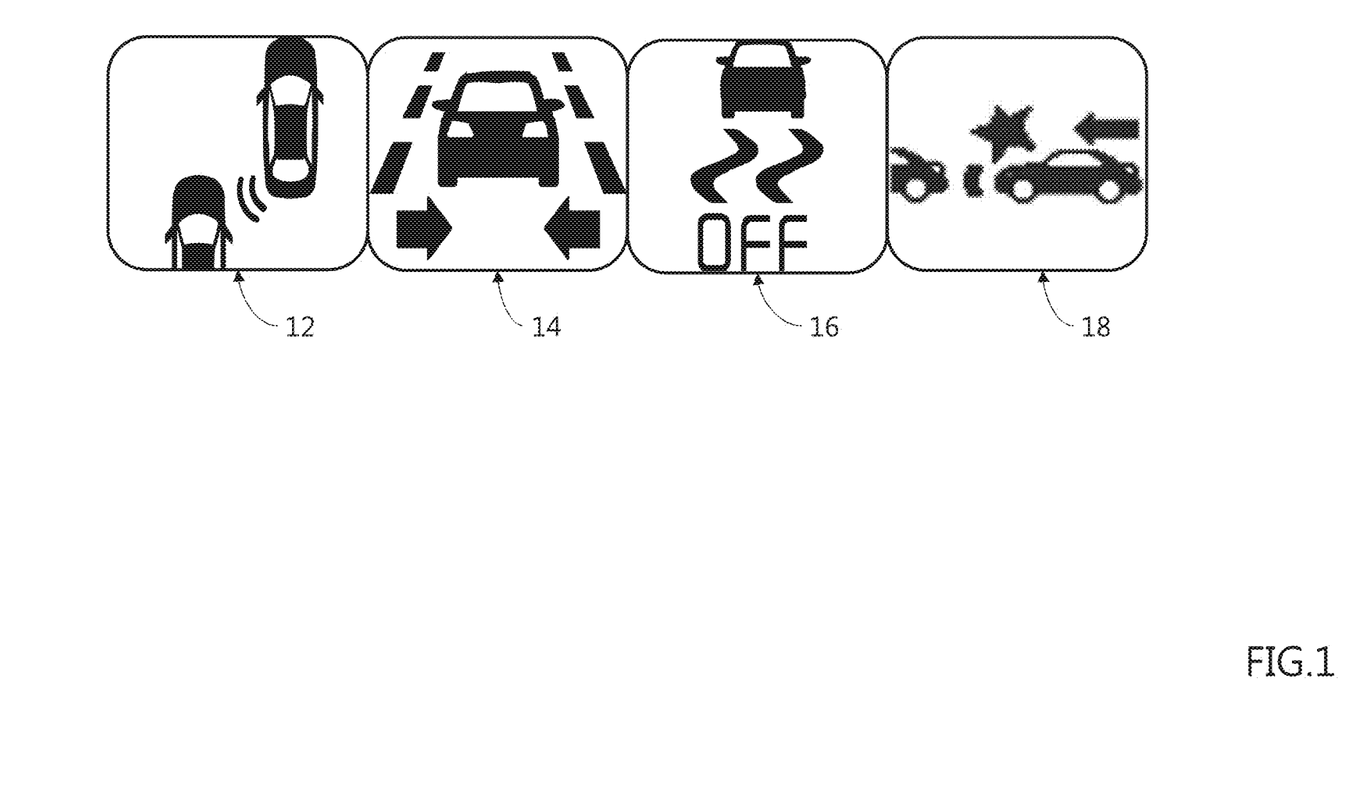
FIG. 1 illustrates control buttons, which are included on a dashboard, associated with a device for supporting safe driving of a vehicle according to an embodiment of the present disclosure.

FIG. 1 illustrates control buttons (switches), which may be included on a dashboard, and associated with a device for supporting safe driving of a vehicle according to an embodiment of the present disclosure.

Referring to FIG. 1, a driver (user) may determine whether to use devices for supporting safe driving of a vehicle or control the corresponding devices through a plurality of input buttons 12, 14, 16 and 18, which may be reserved for changing or adjusting particular configurations and functions, among various input means included on a dashboard.

For instance, the dashboard of the vehicle may include a first button 12 for use of BSD (Blind Spot Detection), a second button 14 for use of LKAS (Lane Keeping Assist System), a third button 16 for use of ESC (Electronic Stability Control) and a fourth button 18 for use of AEB (Autonomous Emergency Braking).

Although the above-mentioned devices are designed to support the safe driving of the driver (user), the driver (user) may selectively use the above-mentioned devices according to various driving conditions. In addition, more safety driving support functions may be added to recently developed vehicles.

For instance, when a driver drives a vehicle having the aforementioned devices mounted thereon, the driver may activate all of the functions related to the safety on a highway. On the contrary, when driving in a city where the traffic is heavy and different driving conditions exist, the driver may restrict the operating ranges of BSD (Blind Spot Detection), LKAS (Lane Keeping Assist System) and the like due to preferences regarding the automatic steering system and inconvenient beeping sounds. As another example, a particular driver may activate all of the safety-related devices before driving and then the driver may not control, or manipulate, the devices while driving. In this case, the driver may not understand the functions of one or more of the safety driving support devices mounted on the vehicle. Moreover, when specific functions related to the multiple buttons (switches) included on the dashboard are not executed, the driver may not recognize a malfunction.

Although the safety driving support devices mounted on the vehicle provide an interface that enables users to select and store detailed configurations of functions through a configuration page, the users may activate most of the functions or select functions according to their preferences. In addition, in many cases, the users may not select and control respective functions/devices according to driving conditions. Moreover, in case of active control functions such as LKAS, active BSD (aBSD) and the like through which the vehicle may intervene in deceleration/acceleration/steering during driving, if drivers activate or deactivate the individual functions such as intervention and warning options depending on situations (e.g., city/highway driving, a presence or non-presence of traffic jams, etc.) on a user setting menu (USM) while driving, such actions may reduce driving safety.

Figure 2:
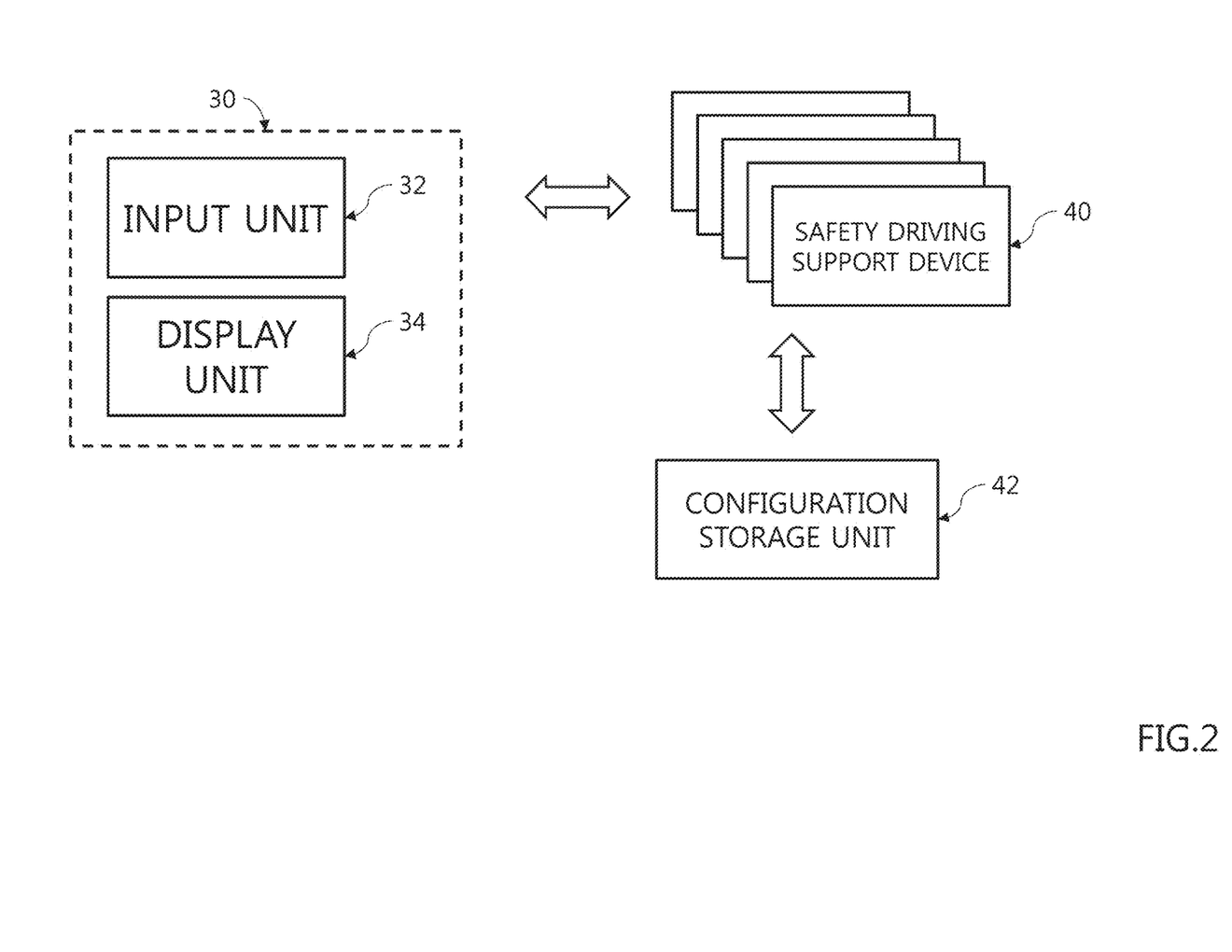
FIG. 2 illustrates a method of controlling operations of safety driving support devices for a vehicle according to an embodiment of the present disclosure.

FIG. 2 illustrates a method of controlling operations of safety driving support devices for a vehicle according to an embodiment of the present disclosure.

Referring to FIG. 2, a plurality of safety driving support devices 40 mounted on a vehicle may be controlled by a single apparatus 30 for configuring an operation of a safety driving device for the vehicle.

The apparatus 30 for configuring the operation of the safety driving device for the vehicle may include an input unit 32 for controlling the operations of the plurality of the safety driving support devices 40 selectively and a display unit 34 for displaying input levels inputted through the input unit 32. Here, the input levels may be differentiated to determine whether to operate each of the plurality of the safety driving support devices 40.

The input unit 32 and the display unit 34 may be located on a dashboard. The input unit 32 may include various input means (e.g., a button and the like). The display unit may include different colors of symbols respectively matched with input levels transferred through the input unit 32.

The apparatus 30 for configuring the operation of the safety driving device for the vehicle may further include a configuration storage unit 42 for storing a driver's respective configuration values with respect to devices mounted on the vehicle. In addition, the apparatus 30 may control the operations of the plurality of the safety driving support devices 40 through interconnection with the configuration storage unit 42. Operating ranges of the plurality of the safety driving support devices 40 may be determined according to input levels transferred through the input unit 32 and the respective values stored in the configuration storage unit 42.

The plurality of the safety driving support devices 40 may include only devices that can be selectively operated by the driver (user). In other words, in a case of a function/device (e.g., airbag and the like) that is not selectively operated by the driver (user), the operation of the function/device may not be determined by the apparatus 30 for configuring the operation of the safety driving device for the vehicle.

For instance, the safety driving support devices 40 for the vehicle may be classified according to the purpose of use, such as information provision and warning, accident avoidance, collision damage reduction, post-collision damage reduction, additional damage prevention and the like. For example, technologies for providing information provision and path guidance may include intelligent cruise control (ICC), smart cruise control (SCC), lane keeping assist system (LKAS), lane departure warning system (LDWS), highway driving assist (HDA), traffic jam assist (TJA), adaptive front-lighting system (AFS), forward collision warning (FCW), intelligent night vision system (INVS), blind spot detection (BSD), pre-crash safety (PCS), and the like. Technologies for accident avoidance may include autonomous emergency braking (AEB), anti-lock brake system (ABS), vehicle stability assist (VSA), electronic stability control (ESC), and the like. Technology for collision damage reduction may include a collision mitigation brake system (CMBS), emergency steering assist (ESA) and the like. Furthermore, technologies for post-collision damage reduction may include safety body structure (SBS), pedestrian safety system (PSS), airbag, seat belt, and the like. Further, technologies for additional damage prevention may include vehicle fire occurrence control, design for facilitating escape/rescue from a vehicle, medical support system, emergency call (eCall) system, and the like. Among various types of safety technology devices, some devices may be consistently operated without a separate operation by a driver (user). However, in a case of other devices, the driver (user) may configure the devices to be suitable for driving conditions such that the devices can be operated selectively or their operating levels can be changed.

Figure 3:
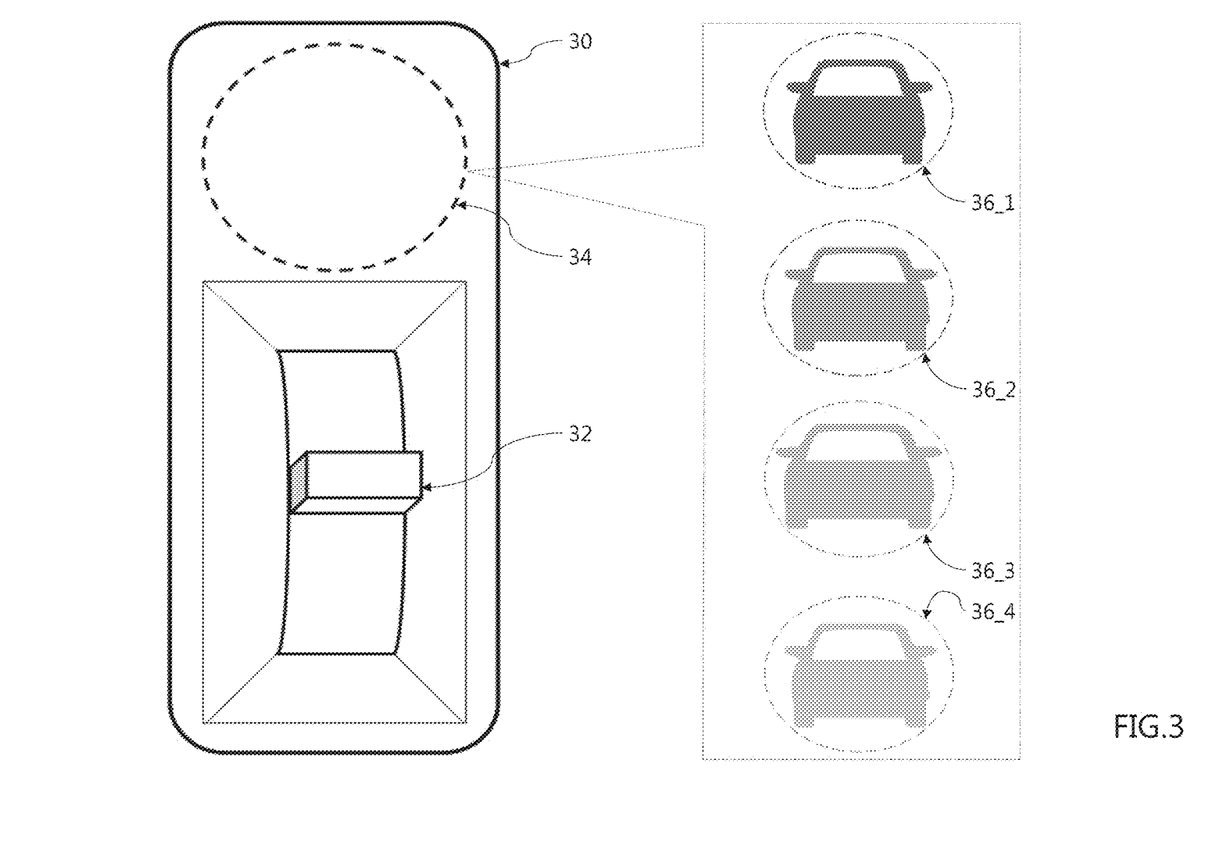
FIG. 3 illustrates an apparatus for configuring operations of safety driving support devices for a vehicle according to an embodiment of the present disclosure.

FIG. 3 illustrates an apparatus for configuring operations of safety driving support devices for a vehicle according to embodiments of the present disclosure.

Referring to FIG. 3, an apparatus 30 for configuring operations of safety driving support devices for a vehicle may include an input unit 32 and a display unit 34.

The input unit 32 may determine an input level based on movement in the vertical direction, or in another direction, and call a screen for detailed configurations of a plurality of the safety driving support devices according to a pressure input. The display unit 34 may display operating ranges of the plurality of the safety driving support devices 40 (cf. FIG. 2), which may be configured by the driver (user), with different colors in response to input levels inputted through the vertical movement of the input unit 32.

The input levels inputted through the input unit 32 may be differentiated into a plurality of levels. According to the respective levels, the operating ranges of the plurality of the safety driving support devices may be determined. For instance, the display unit 34 may display the input levels inputted through the input unit 32 using symbols 36_1, 36_2, 36_3 and 36_4, which may be distinguished based on four different colors or four different brightness levels. These symbols 36_1, 36_2, 36_3 and 36_4 may help the driver (user) understand the operating ranges of the plurality of the safety driving support devices 40 more easily and rapidly.

To show signs corresponding to the selected operating ranges of the safety driving support devices at one specific point, the display unit 34 on the input unit 32 may represent a degree of system intervention through intuitive colors using LEDs with colors. For instance, when the vehicle is started, i.e., in an initial state, in which safe driving is supported, of the safety driving support device, a green color may be displayed to show safety. When the safety driving support device provides a warning only, a white color may be displayed. When an alarm is deactivated, a yellow color may be displayed. When driving assistance functions of all the safety driving support devices are deactivated, a red color may be displayed to inform the driver that careful driving is required since the all safety function are deactivated.

For instance, the plurality of the safety driving support devices 40 may perform at least one of driving intervention, visual warning and aural warning selectively. In this case, the input levels inputted through the input unit 32 may include a first level in which the plurality of the safety driving support devices 40 perform the driving intervention, a second level in which the plurality of the safety driving support devices 40 perform both of the visual warning and the aural warning, a third level in which the plurality of the safety driving support devices 40 perform the visual warning without the aural warning, and a fourth level in which the plurality of the safety driving support devices 40 are not operated.

Figure 4A:
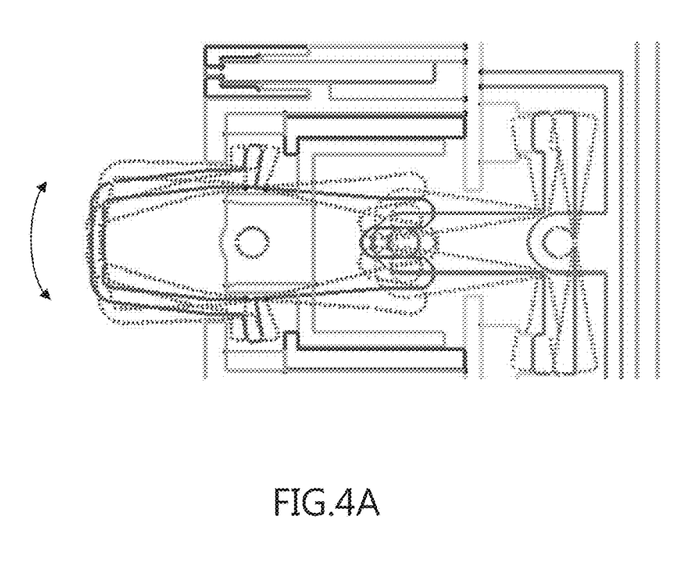
FIGS. 4a and 4b are diagrams illustrating a structure of the input unit illustrated in FIG. 3.
Figure 4B:
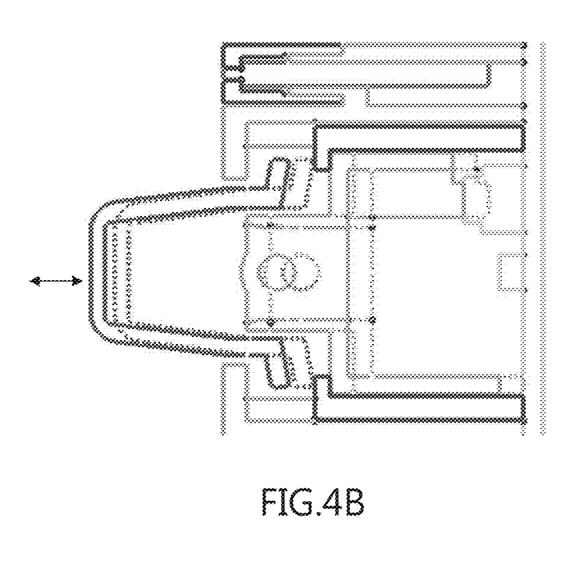

FIGS. 4a and 4b are diagrams for describing a structure of the input unit illustrated in FIG. 3 according to embodiments of the present disclosure.

Referring to FIGS. 4a and 4b, a structure of the input unit 32 (cf. FIG. 2) is described with reference to an example of a button corresponding to an input means capable of detecting two different types of movement. In particular, FIG. 4a illustrates a transmission structure of a signal in accordance with a movement of the input unit 32 when the input unit 32 moves in a vertical direction. And, FIG. 4b illustrates a transmission structure of a signal according to a movement of the input unit 32 when the input unit 32 is pressed.

By moving the button (switch) of FIG. 4a in the vertical direction, a driver (user) may control the degree of intervention of a plurality of safety driving support devices in an integrated manner while driving. That is, overall information on whether a vehicle system controls steering, acceleration, deceleration and the like, or just warns the driver (user) about dangerous situations is displayed through the display unit (cf. FIG. 3) so that the driver can intuitively understand the degree of intervention of the vehicle system. The above input unit 32 may replace individual existing switches or be used for integrated control of all functions together with the switches.

Further, in some embodiments, the button of the input unit 32 can be replaced with other devices/means having two different types of movement or input methods.

Figure 5:
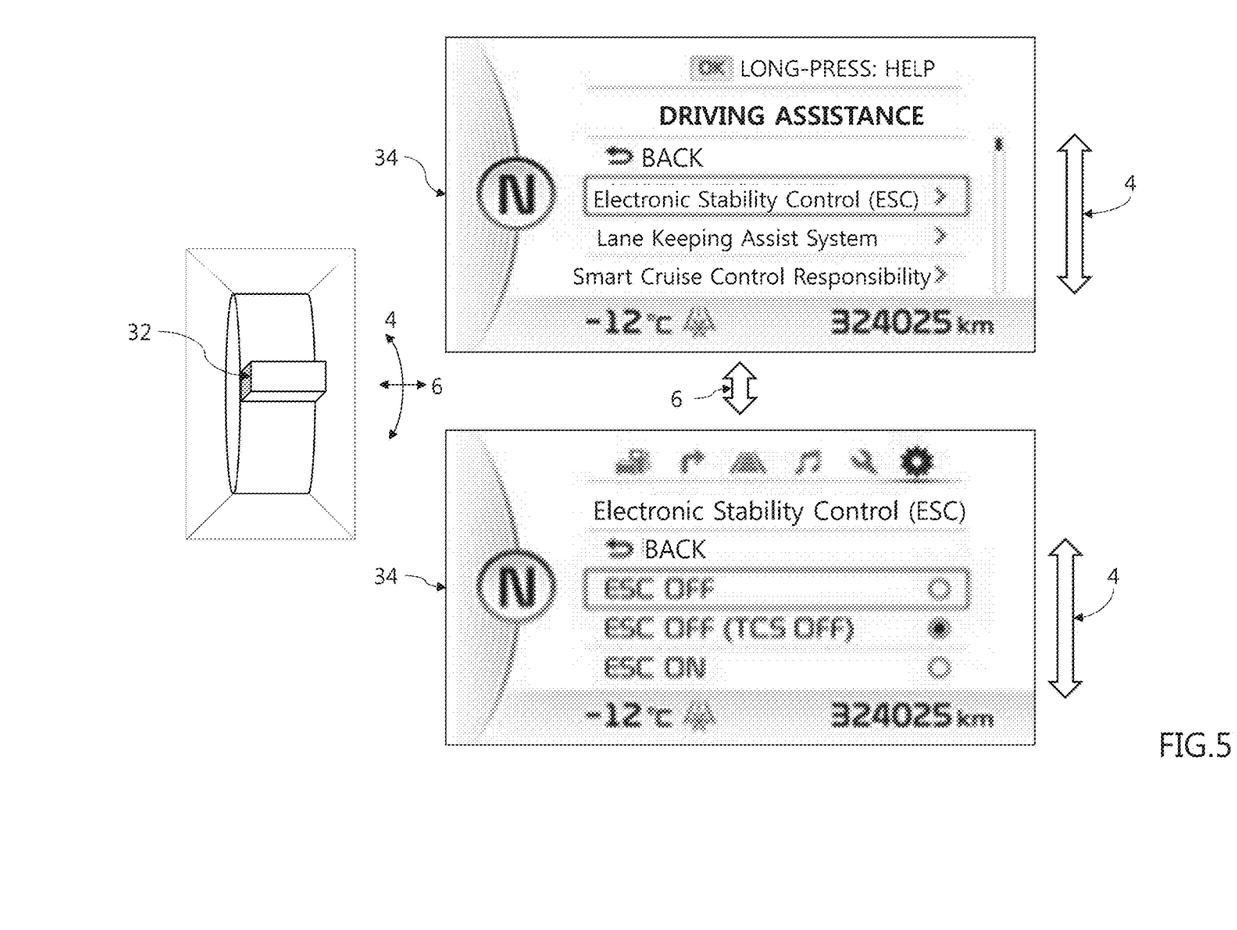
FIG. 5 is a diagram illustrating operations of a display unit corresponding to an input unit according to an embodiment of the present disclosure.

FIG. 5 is a diagram for describing operations of a display unit corresponding to an input unit according to an embodiment of the present disclosure.

Referring to FIG. 5, a plurality of safety driving support devices mounted on a vehicle may be controlled by a vertical movement 4 of the input unit 32 and a pressure 6 imposed to the input unit 32. The display unit 34 may display user interfaces corresponding to input values transferred through the input unit 32. For instance, if the input unit 32 moves in the vertical direction 4, the display unit 34 may display corresponding information by scrolling information up or down 4. If the pressure 6 is imposed to the input unit 32, the vehicle system may recognize that a user interface indicated on a screen of the display unit 34 is to be selected. Thereafter, the screen of the display unit 34 may switch to a screen for the indicated user interface 6. In other words, a driver (user) can review and select the user interface provided by the display unit 34 by operating the input unit 32 as described above. In addition, the driver (user) can search for, select and operate a preferred safety driving support device through the display unit 34 easily.

The plurality of the safety driving support devices mounted on the vehicle may be provided with different levels in a user interface according to functions, operating conditions, preference of the driver (user), authorization of the driver (user), etc. Alternatively, the similar devices may be grouped broadly. In this case, after searching for the plurality of the safety driving support devices provided with the same level or different levels, the driver (user) may selectively operate the devices or change their configurations.

Figure 6:
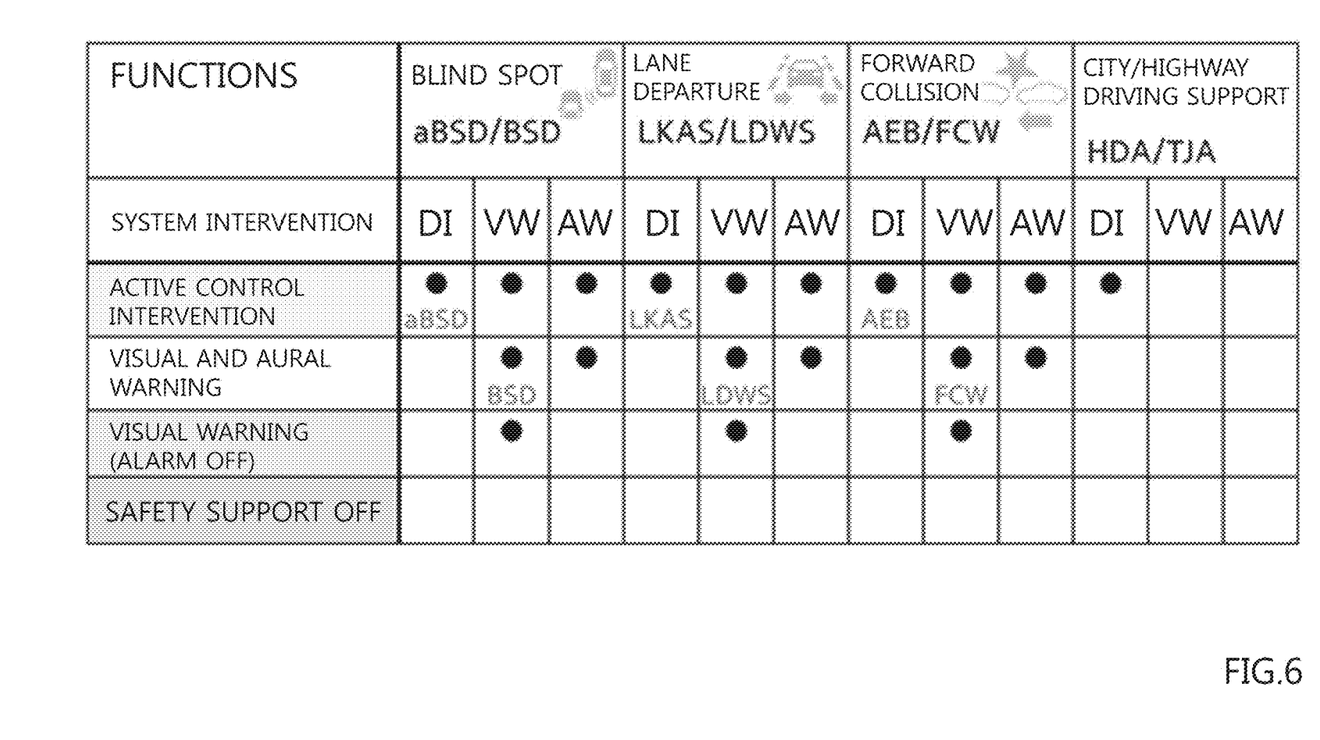
FIG. 6 illustrates operating ranges of safety driving support devices for a vehicle according to an embodiment of the present disclosure.

FIG. 6 illustrates operating ranges of safety driving support devices for a vehicle according to embodiments of the present disclosure.

Referring to FIG. 6, a plurality of safety driving support devices is mounted on a vehicle. For instance, blind spot detection (BSD) for providing information and warning on a blind spot during driving and active BSD (aBSD) for actively intervening during a driver's driving for obstacle avoidance may be included in the vehicle. In addition, a lane departure warning system (LDWS) for providing information and warning to prevent lane departure in driving and a lane keeping assist system (LKAS) for intervening in a driver's driving in the case of lane departure may be included in the vehicle. Moreover, forward collision warning (FCW) for providing information and warning to prevent a forward collision during driving and autonomous emergency braking (AEB) for intervening during a driver's driving may be included in the vehicle. Furthermore, highway driving assist (HDA) and traffic jam assist (TJA) capable of intervening in a driver's driving to handle traffic conditions (surrounding conditions) during driving may be included in the vehicle.

According to the degree of system intervention (i.e., input levels transferred through the input unit), FIG. 6 shows whether each of the safety driving support devices is operated and operating ranges of the devices (In the drawing, mark '●' means that the corresponding level and device are selected). In such various safety driving functions/devices, an active control option of enabling the vehicle to perform steering or acceleration/deceleration instead of the driver may be included. On the other hand, in some cases, the various safety driving functions/devices can be utilized partially. In this case, without the active control, warning may be provided only. Moreover, levels of the warning such as a vibration, an alarm and the like may be set as the user desires. Since it may be difficult and complicated to set such detailed configurations while driving, a step for setting the configurations may be implemented in a simple manner. For instance, by categorizing the system intervention into driving intervention (DI), visual warning (VW) and aural warning (AW), individual functions/devices may be controlled based on predetermined combinations in accordance with driving conditions in an integrated manner.

A driver (user) may search for and select a function in each menu/option of a USM (user setting menu) tab and then configure an intervention level and an alarm with respect to each function before the input unit 34 (cf. FIG. 2) capable of integrating and controlling the individual safety driving support functions/devices is applied. If the driver performs the above-described operations while driving, it may reduce driving safety. However, in the case of the vehicle with the input unit capable of integrating and controlling the individual safety driving support functions/devices cause, the driver (user) may easily select a preferred configuration such as active control, visual warning, aural warning, or the like through a predetermined combination and thus the driving safety can be enhanced.

Figure 7:
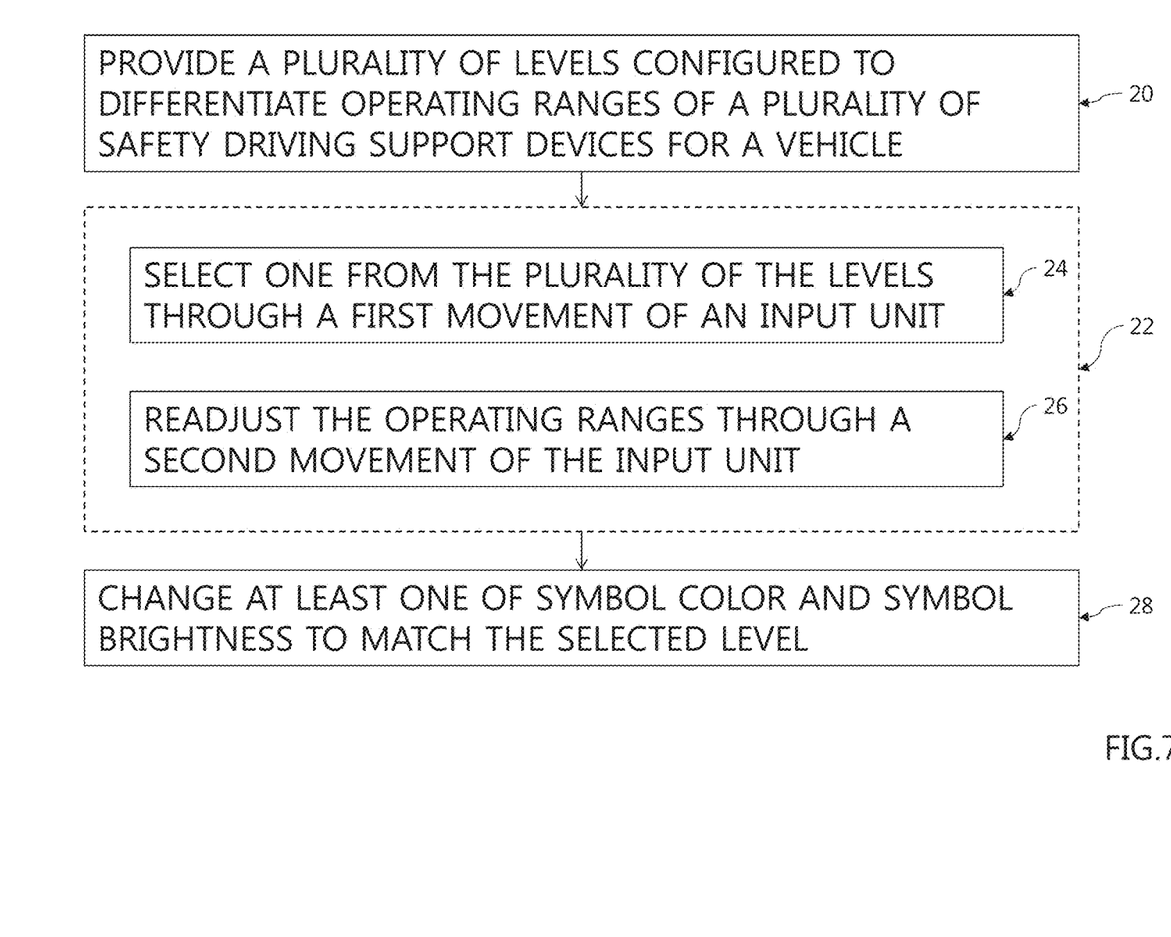
FIG. 7 illustrates a method of configuring an operation of a safety driving device for a vehicle according to an embodiment of the present disclosure.

FIG. 7 illustrates a method of configuring an operation of a safety driving device for a vehicle according to an embodiment of the present disclosure.

Referring to FIG. 7, a method of configuring an operation of a safety driving device for a vehicle may include a step 20 of providing a plurality of levels configured to differentiate operating ranges of a plurality of safety driving support devices for the vehicle and a step 22 of determining the operating ranges of the plurality of the safety driving support devices for the vehicle.

Moreover, the step 22 of determining the operating ranges of the plurality of the safety driving support devices for the vehicle may include a step 24 of selecting one from the plurality of the levels through a first movement of an input unit and a step 26 of readjusting the operating ranges through a second movement of the input unit different from the first movement of the input unit.

Furthermore, the method of configuring the operations of the safety driving device for the vehicle may further include a step 28 of changing at least one of a symbol color and a symbol brightness to match the selected level.

The plurality of the safety driving support devices 40 may be selectively applied according to devices/functions mounted on the vehicle. Here, the plurality of the safety driving support devices 40 may include a device that may be selectively operated by the driver (user).

For instance, the plurality of the safety driving support devices may selectively perform at least one selected from the group consisting of driving intervention, visual warning and aural warning. In this case, the plurality of the levels may include a first level in which the plurality of the safety driving support devices performs the driving intervention, a second level in which the plurality of the safety driving support devices performs both of the visual warning and the aural warning, a third level in which the plurality of the safety driving support devices performs the visual warning, and a fourth level in which the plurality of the safety driving support devices are not operated.

The above-mentioned method according to embodiments may be programmed to be executed in, or with, a computer and may be stored on a computer readable recording medium. Examples of the computer readable recording medium include ROM, RAM, CD-ROMs, magnetic tape, floppy disk, and optical data storage devices including carrier waves (e.g., transmission through the Internet).

The computer readable recording medium may also be distributed over network coupled computer systems so that the computer readable code is stored and executed in a distributed fashion. Also, functional programs, codes, and code segments for accomplishing the above-mentioned method can be easily construed by programmers skilled in the art to which the present disclosure pertains.

It will be apparent to those skilled in the art that various modifications and variations can be made in the present disclosure without departing from the spirit or scope of the disclosure.

Thus, the detailed explanation should not be interpreted limitedly but considered as exemplary in all aspects. The scope of the present disclosure should be determined by a reasonable interpretation of the attached claims. All changes within the equivalent scope of the present disclosure are included in the scope of the present disclosure.

What is claimed is:

1. An apparatus for selecting an operation of a safety driving device for a vehicle, the apparatus comprising an input device capable of selectively controlling operations of a plurality of safety driving support devices for the vehicle, wherein input levels inputted through the input device are differentiated to determine whether to operate each of the plurality of the safety driving support devices for the vehicle,
   wherein the plurality of the safety driving support devices for the vehicle comprises at least one selected from the group consisting of, smart cruise control (SCC), lane keeping assist system (LKAS), lane departure warning system (LDWS), highway driving assist (HDA), traffic jam assist (TJA), adaptive front-lighting system (AFS), intelligent night vision system (INVS), blind spot detection (BSD), pre-crash safety (PCS), autonomous emergency braking (AEB), anti-lock brake system (ABS), vehicle stability assist (VSA), and emergency steering assist (ESA).

2. The apparatus of claim 1, wherein the input device determines the input levels based on vertical movement of the input device and wherein the input device calls a screen for detailed configurations of the plurality of the safety driving support devices for the vehicle according to a pressure input.

3. The apparatus of claim 1, wherein the plurality of the safety driving support devices for the vehicle selectively performs at least one selected from the group consisting of driving intervention devices, visual warning devices and aural warning devices.

4. The apparatus of claim 3, wherein the input levels comprise a plurality of different levels and wherein an operating range of each of the plurality of the safety driving support devices for the vehicle is determined based on each of the plurality of the levels.

5. The apparatus of claim 4, wherein the input levels comprise;
   a first level in which the plurality of the safety driving support devices for the vehicle performs the driving intervention devices;
   a second level in which the plurality of the safety driving support devices for the vehicle performs both of the visual warning and the aural warning devices;
   a third level in which the plurality of the safety driving support devices for the vehicle performs the visual warning devices; and
   a fourth level in which the plurality of the safety driving support devices for the vehicle are not operated.

6. The apparatus of claim 1, further comprising a display device for displaying the input levels.

7. The apparatus of claim 6, wherein the display device comprises symbols indicating the input level, wherein the symbols can be discriminated from each other by at least one of different colors and different brightness levels, corresponding to the input levels.

8. The apparatus of claim 6, wherein the input device and the display device are located on a dashboard.

9. The apparatus of claim 1, wherein the plurality of the safety driving support devices for the vehicle comprises only devices capable of performing an operation selected by a driver.

10. The apparatus of claim 1, further comprising a memory for storing a driver's respective configuration values with respect to devices mounted on the vehicle and wherein the plurality of the safety driving support devices for the vehicle are operated based on the input levels transferred through the input device and the respective configuration values.

11. A method of configuring an operation of a safety driving device for a vehicle, comprising:
    providing a plurality of levels for differentiating operating ranges of a plurality of safety driving support devices for the vehicle;
    selecting one from the plurality of the levels through a first movement of an input device; and
    readjusting the operating ranges through a second movement of the input device different from the first movement of the input device,
    wherein the plurality of the safety driving support devices for the vehicle comprises at least one selected from the group consisting of, smart cruise control (SCC), lane keeping assist system (LKAS), lane departure warning system (LDWS), highway driving assist (HDA), traffic jam assist (TJA), adaptive front-lighting system (AFS), intelligent night vision system (INVS), blind spot detection (BSD), pre-crash safety (PCS), autonomous emergency braking (AEB), anti-lock brake system (ABS), vehicle stability assist (VSA), and emergency steering assist (ESA).

12. The method of claim 11, further comprising changing at least a color or a brightness level of a symbol to match the selected level, wherein the symbol indicates the input level.

13. The method of claim 11, wherein the plurality of the safety driving support devices for the vehicle selectively performs at least one selected from the group consisting of driving intervention devices, visual warning devices and aural warning devices.

14. The method of claim 13, wherein the plurality of the levels comprise:
    a first level in which the plurality of the safety driving support devices for the vehicle performs the driving intervention devices;
    a second level in which the plurality of the safety driving support devices for the vehicle performs both of the visual warning and the aural warning devices;
    a third level in which the plurality of the safety driving support devices for the vehicle performs the visual warning devices; and
    a fourth level in which the plurality of the safety driving support devices for the vehicle are not operated.

15. An input apparatus for controlling an operation of a safety driving device for a vehicle, comprising:
    a wheel for detecting a first input on the basis of a degree of scrolling in either a vertical or a horizontal movement; and
    a protrusion on the wheel for detecting a second input on the basis of a pressure,
    wherein, based on the first input and the second input, the input apparatus controls operations differentiated to determine whether to operate each of a plurality of safety driving support devices for the vehicle, wherein the plurality of the safety driving support devices for the vehicle comprises at least one selected from the group consisting of, smart cruise control (SCC), lane keeping assist system (LKAS), lane departure warning system (LDWS), highway driving assist (HDA), traffic jam assist (TJA), adaptive front-lighting system (AFS), intelligent night vision system (INVS), blind spot detection (BSD), pre-crash safety (PCS), autonomous emergency braking (AEB), anti-lock brake system (ABS), vehicle stability assist (VSA), and emergency steering assist (ESA).

16. The input apparatus of claim 15, wherein the first input determines operating ranges of the plurality of the safety driving support devices for the vehicle and wherein the second input calls a screen for configuring operations of the plurality of the safety driving support devices for the vehicle.

17. The input apparatus of claim 16, wherein the operating ranges comprise:

a first level in which the plurality of the safety driving support devices for the vehicle performs driving intervention devices;

a second level in which the plurality of the safety driving support devices for the vehicle performs visual warning and aural warning devices;

a third level in which the plurality of the safety driving support devices for the vehicle performs the visual warning devices; and a fourth level in which the plurality of the safety driving support devices for the vehicle are not operated.

18. The input apparatus of claim 16, wherein the input apparatus is further engaged with a display device for displaying the operating ranges.

19. The input apparatus of claim 18, wherein the display device shows symbols indicating the input level, wherein the symbols can be discriminated from each other by at least one of different colors and different brightness levels, corresponding to the operating ranges.

* * * * *